(12) United States Patent
Kurita et al.

(10) Patent No.: US 12,214,863 B2
(45) Date of Patent: Feb. 4, 2025

(54) RIBLET STRUCTURE AND OBJECT

(71) Applicant: JAPAN AEROSPACE EXPLORATION AGENCY, Tokyo (JP)

(72) Inventors: Mitsuru Kurita, Tokyo (JP); Hiroyuki Abe, Tokyo (JP); Hidetoshi Iijima, Tokyo (JP); Seigo Koga, Tokyo (JP)

(73) Assignee: Japan Aerospace Exploration Agency, Tokyo (JP)

( * ) Notice: Subject to any disclaimer, the term of this patent is extended or adjusted under 35 U.S.C. 154(b) by 0 days.

(21) Appl. No.: 18/245,562

(22) PCT Filed: Sep. 22, 2021

(86) PCT No.: PCT/JP2021/034773
§ 371 (c)(1),
(2) Date: Mar. 16, 2023

(87) PCT Pub. No.: WO2022/085357
PCT Pub. Date: Apr. 28, 2022

(65) Prior Publication Data
US 2023/0365251 A1    Nov. 16, 2023

(30) Foreign Application Priority Data

Oct. 19, 2020    (JP) .................................. 2020-175216

(51) Int. Cl.
*B64C 21/10* (2006.01)
*F15D 1/00* (2006.01)
*F15D 1/12* (2006.01)

(52) U.S. Cl.
CPC .............. *B64C 21/10* (2013.01); *F15D 1/004* (2013.01); *F15D 1/12* (2013.01); *B64C 2230/26* (2013.01)

(58) Field of Classification Search
CPC ... B64C 21/10; B64C 2230/26; F15D 1/0035; F15D 1/004; F15D 1/12
See application file for complete search history.

(56) References Cited

U.S. PATENT DOCUMENTS 4,706,910 A * 11/1987 Walsh ..................... B64C 21/10
296/180.1
6,345,791 B1 * 2/2002 McClure ................. B64C 21/10
244/130

(Continued)

FOREIGN PATENT DOCUMENTS

FR          2 899 945 A1    10/2007
JP          2005-522644 A    7/2005
(Continued)

OTHER PUBLICATIONS

International Search Report dated Nov. 22, 2021 in International Application No. PCT/JP2021/034773.

*Primary Examiner* — Michael C Zarroli
*Assistant Examiner* — Ka Chun Leung
(74) *Attorney, Agent, or Firm* — Saliwanchik, Lloyd & Eisenschenk

(57) ABSTRACT

A riblet structure includes a plurality of wave-shaped riblets on a surface thereof, in which each of the riblets has a smaller peak height as an angle formed between a ridge line and a fluid flow direction becomes larger, a width between peak bases in a direction orthogonal to the fluid flow direction becomes smaller as the angle becomes larger, and an angle formed between a slope of a peak of the riblet and the surface at the peak base or a curvature at the peak base is identical at any position in a cross-sectional shape in the direction orthogonal to the fluid direction.

10 Claims, 5 Drawing Sheets

(56) References Cited

U.S. PATENT DOCUMENTS

| | | | |
|---|---|---|---|
| 2004/0155150 A1 | 8/2004 | Krohmer et al. | |
| 2011/0262705 A1* | 10/2011 | Gupta | B64C 21/10 |
| | | | 428/156 |
| 2012/0025025 A1* | 2/2012 | Brennan | F16L 9/006 |
| | | | 138/140 |
| 2017/0081021 A1 | 3/2017 | Song | |
| 2019/0023379 A1 | 1/2019 | Okabayashi et al. | |

FOREIGN PATENT DOCUMENTS

| | | |
|---|---|---|
| JP | 2017-155882 A | 9/2017 |
| JP | 2018-27510 A | 2/2018 |

* cited by examiner

RIBLET STRUCTURE AND OBJECT

CROSS-REFERENCE TO RELATED APPLICATIONS

This application is the U.S. national stage application of International Patent Application No. PCT/JP2021/034773, filed Sep. 22, 2021, which claims the benefit under 35 U.S.C. § 119 of Japanese Application No. 2020-175216, filed Oct. 19, 2020, the disclosures of each of which are incorporated herein by reference in their entirety.

TECHNICAL FIELD

The present invention relates to a riblet structure, which is applied to the fields of aircraft, ship, fluid machinery, and the like, and an object including such a riblet structure on a surface thereof.

BACKGROUND ART

In the field of aircraft, the technology of forming riblets on a surface of an aircraft body and reducing air resistance to improve a fuel efficiency has been tried. Further, the technology of reducing resistance of a fluid by using riblets has been examined also in various fields other than the aircraft.

The inventors of the present invention have proposed in Japanese Patent Application Laid-open No. 2017-155882 (hereinafter referred to as "Patent Literature 1") the technology in which riblets, which have been conventionally formed into a linear shape, are configured to be formed into a wave shape and the height of the riblets is also changed along the wave shape, thus enhancing resistance reducing performance (see Patent Literature 1). Japanese Patent Application Laid-open No. 2018-27510 (hereinafter referred to as "Patent Literature 2") discloses the technology associated with the present invention.

The wave-shaped riblets aiming at higher resistance reducing performance than the conventional linear riblets have been studied.

In the riblet, a top portion at which airflow is fast has a larger surface friction resistance. Meanwhile, a valley portion at which airflow is slow has a smaller surface friction resistance. As a result, the total surface friction resistance is reduced. The linear riblet has the surface friction resistance only, whereas the wave-shaped riblet has a total resistance as a combination of pressure resistance and surface friction resistance.

BRIEF SUMMARY OF INVENTION

The wave-shaped riblets block a flow at a portion at which an angle formed between a ridge line and the direction of the flow is large, and thus unnecessary pressure resistance is generated. In this regard, in order to reduce the pressure resistance, riblets in which the height of the top is changed have been devised. However, it has been difficult to manufacture riblets in which the height is changed along a wave shape in accordance with the angle formed between the ridge line and the direction of the flow.

The inventors of the present invention have obtained new findings as follows: if the height of a peak is changed by trimming the top thereof, a flat area is increased at the top, and thus the surface friction resistance increases and the resistance reducing performance of the riblets deteriorates.

In view of the circumstances as described above, it is an object of the present invention to provide a riblet structure that increases resistance reducing performance and is easily manufacturable, and an object including such a structure on a surface thereof.

To achieve the object described above, a riblet structure according to the present invention includes a plurality of wave-shaped riblets on a surface thereof, in which each of the riblets has a smaller peak height as an angle formed between a ridge line and a first direction becomes larger, the first direction being an advance direction of waves of the wave-shaped riblets, a width between peak bases in a direction orthogonal to the first direction becomes smaller as the angle becomes larger, and an angle formed between a slope of a peak of the riblet and the surface at the peak base or a curvature at the peak base is identical at any position in a cross-sectional shape in the direction orthogonal to the first direction. Here, the first direction that is the advance direction of the waves of the wave-shaped riblets is a flow direction of a fluid flowing on the surface.

In the present invention, as the angle formed between the ridge line and the flow direction of the fluid becomes larger, the wave-shaped riblet has a smaller peak height, so that the occurrence of unnecessary pressure resistance can be suppressed, and resistance reducing performance can be enhanced. In addition, as the angle described above becomes larger, the width between the peak bases in the direction orthogonal to the flow direction of the fluid becomes smaller, and the angle formed between the slope of the peak and the surface at the peak base or the curvature at the peak base is identical at any position in a cross-sectional shape in the direction orthogonal to the flow direction of the fluid. Thus, irregularities, by which the tip of the riblet can be formed to have an acute angle, can be formed in the surface of a transfer roller by only moving a tool bit or the like. The riblets formed using such a roller do not require the operation of cutting its tip as in conventional riblets, thus facilitating the manufacture.

In the riblet structure according to the present invention, each of the riblets has an acute-angled top at any position. This makes it possible to reduce the surface friction resistance more and to enhance the resistance reducing performance more.

In the riblet structure according to an embodiment of the present invention, the cross-section of each of the riblets has a peak having a shape of a triangle, a trapezoid, a circle, or an ellipse.

In the riblet structure according to an embodiment of the present invention, the cross-section of each of the riblets has a peak having a shape obtained by cutting a circle or an ellipse.

In the riblet structure according to an embodiment of the present invention, the ridge line of each of the riblets has a sinusoidal shape, and a height of each of the riblets changes in a sinusoidal manner.

An object such as an aircraft or ship according to the present invention includes the riblet structure described above on a surface thereof.

Advantageous Effects of Invention

According to the present invention, it is possible to provide a riblet structure that increases resistance reducing performance and is easily manufacturable, and an object including such a structure on a surface thereof.

DETAILED DESCRIPTION OF THE INVENTION

Hereinafter, an embodiment of the present invention will be described with reference to the drawings.

Figure 1:
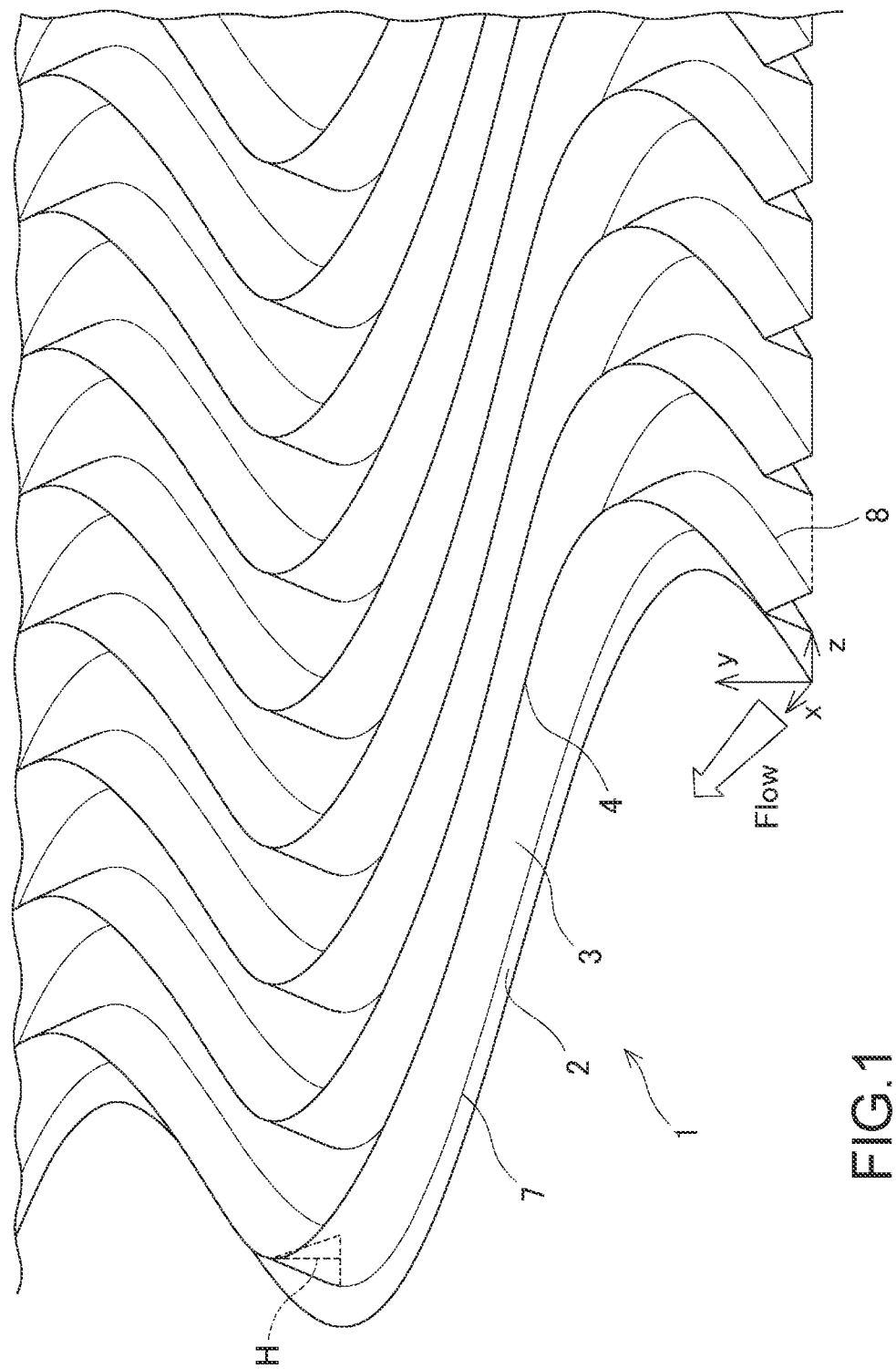
FIG. 1 is a perspective view of a riblet structure according to an embodiment of the present invention.
Figure 2:
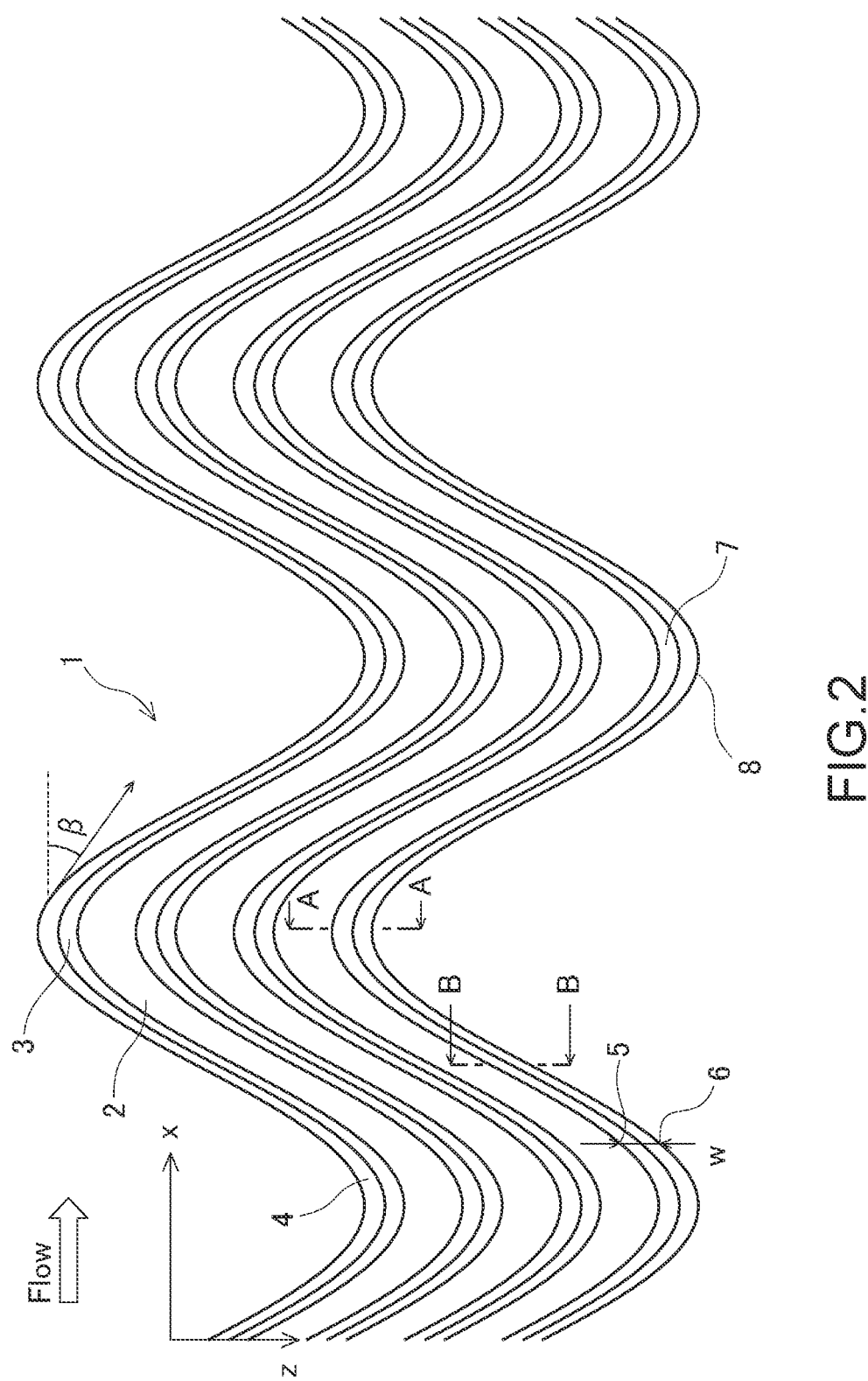
FIG. 2 is a plan view showing the riblet structure in FIG. 1 in a partially enlarged manner.
Figure 3:
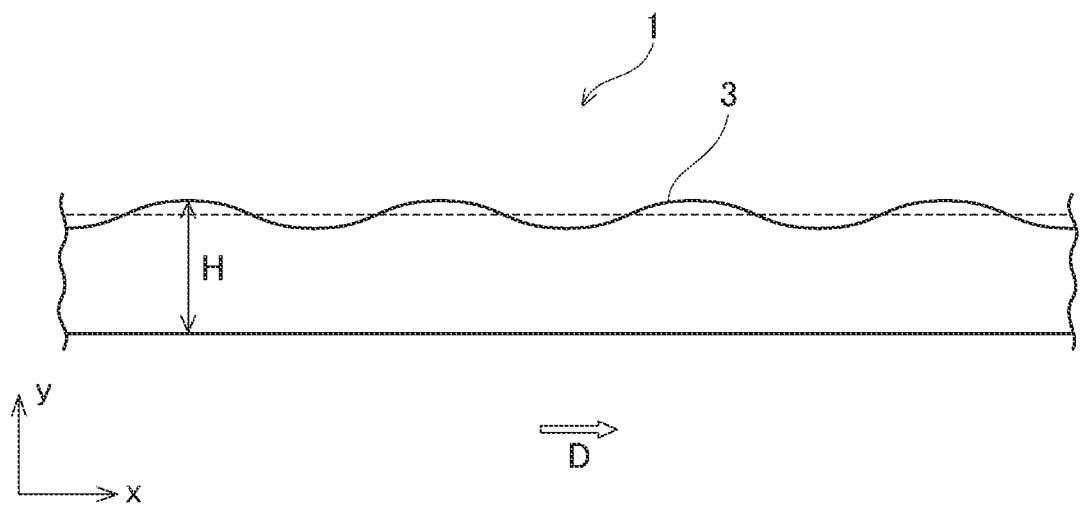
FIG. 3 is a side view showing the riblet structure in FIG. 1 in a partially enlarged manner.

FIG. 1 is a perspective view of a riblet structure according to an embodiment of the present invention. FIG. 2 is a plan view showing the riblet structure in a partially enlarged manner. FIG. 3 is a side view showing the riblet structure in a partially enlarged manner.

A riblet structure 1 includes a plurality of wave-shaped riblets 3, which cyclically change, on a surface 2. In other words, each riblet 3 is formed into a wave shape that cyclically changes as viewed from above the surface 2 (upper surface). Here, the wave shape that cyclically changes typically refers to a sinusoidal shape.

The riblet structure 1 is provided to an object such as an aircraft, ship, pipe arrangement of plants, and a pipeline such that a ridge line 4 or the like of the riblet 3 comes into contact with a fluid. In the aircraft, ship, or the like that moves through a fluid such as air or water, the riblets 3 are provided to an outer surface of the object so as to be directed outward. In the pipe arrangement of plants, the pipeline, or the like, through which liquid or gas flows, the riblets 3 are provided to an inner surface of the object so as to be directed inward. In both cases, each riblet 3 is provided to a surface of the object such that a direction of the center line of a displacement of the wave shape, which cyclically changes, of each riblet 3, typically a sinusoidal shape, coincides with a flow direction of a fluid.

The riblet structure 1 is typically configured by attaching a sheet, which includes a large number of riblets 3 formed on the surface 2, to the surface of the object. The technology associated with the above configuration is disclosed in Patent Literature 2. As a matter of course, the riblets 3 may be formed on the surface of the object itself or may have other forms.

The plurality of riblets 3 are formed in a first direction that is an advance direction of the waves of the wave-shaped riblets 3. Typically, the plurality of riblets 3 are formed along a flow direction x of a fluid flowing on the surface 2. The plurality of riblets 3 may be formed in the direction of the center line of a displacement of the wave shape, which cyclically changes, of each riblet 3, typically a sinusoidal shape.

Adjacent riblets 3 are formed to be parallel at predetermined intervals in a direction z orthogonal to the x direction, for example, if the object is an aircraft, at intervals of approximately 100 μm.

Hereinafter, a single riblet 3 will be described, but each riblet 3 has an identical shape.

The riblet 3 typically has a triangular cross-sectional shape. For example, in the riblet 3, a y-z cross-section orthogonal to the flow direction x of the fluid is an isosceles triangle having a top angle of around 45°. In order to enhance surface friction resistance reducing performance, a smaller top angle is desirable. However, for example, when the technology of Patent Literature 2 already mentioned is adopted, it has been favorable to form the riblets 3 from coating and, in that case, to select 45° because of the trade-off with an aspect of manufacture. As a matter of course, the present invention is not limited to such a top angle. If the tip of the top is not acute-angled and is somewhat rounded, that is, deformed into a trapezoid having a flat-surface, a curved surface such as a circle or an ellipse, or the like when viewed in an enlarged manner, this is included in the technical range of the present invention. In this specification, the continuous line of the top of the riblet 3 is assumed as the ridge line 4.

The riblet 3 has a lower height H as an angle β formed between the ridge line 4 and the flow direction x of the fluid becomes larger. In other words, the height H of the riblet 3 is not constant; is the lowest at a position where the angle β formed between the ridge line 4 and the flow direction x of the fluid is the largest; is the highest at a position where the angle β formed between the ridge line 4 and the flow direction x of the fluid is zero; and is a height that gradually continuously changes between those positions. In other words, the riblet 3 has the height H that changes cyclically in a wavelike manner.

The riblet 3 has a smaller width W between peak bases 5 and 6 in the direction z orthogonal to the flow direction x of the fluid as the angle β formed between the ridge line 4 and the flow direction x of the fluid becomes larger. In other words, the width W is not constant; is the narrowest at a position where the angle β formed between the ridge line 4 and the flow direction x of the fluid is the largest, that is, a position where the height H of the riblet 3 is the lowest; is the widest at a position where the angle β formed between the ridge line 4 and the flow direction x of the fluid is zero, that is, a position where the height H of the riblet 3 is the highest; and is a width that gradually continuously changes between those positions. Note that the continuous lines of the peak bases 5 and 6 of the riblet 3 are assumed as the peak base lines 7 and 8, respectively.

Figure 4:
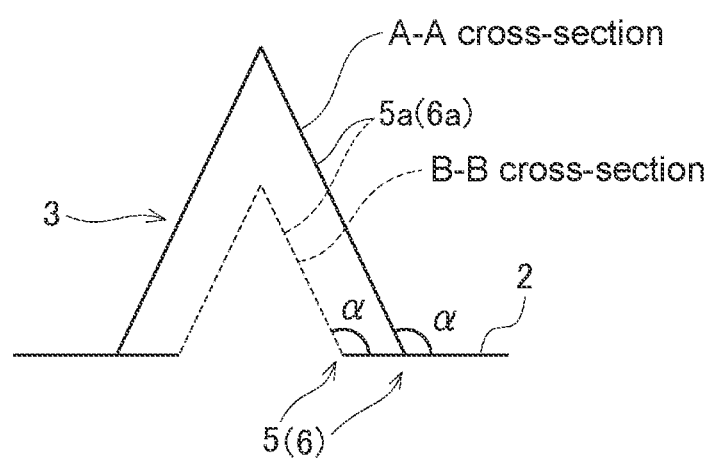
FIG. 4 is a diagram showing the A-A cross-section and the B-B cross-section of FIG. 2.

FIG. 4 is a diagram showing the A-A cross-section and the B-B cross-section of FIG. 2.

In the riblet 3 according to this embodiment, the cross-sectional shape in the direction orthogonal to the flow direction x of the fluid is similar at any position. Further, in the riblet structure 1 according to this embodiment, all the riblets 3 have the same shape. Therefore, in all the riblets 3, the cross-sectional shapes in the direction orthogonal to the flow direction x of the fluid are similar. In other words, in adjacent riblets 3, the cross-sectional shapes in the direction orthogonal to the flow direction x of the fluid are similar at any position.

The inventors of the present invention have proposed in Patent Literature 1 the technology in which the riblets are configured to be formed into a wave shape and the height H of the riblets is also changed along the wave shape, thus enhancing resistance reducing performance. The method of manufacturing such riblets is typically disclosed in Patent Literature 2. This technology is for preparing a sheet, in which a material constituting the riblet structure 1 is applied onto a water-soluble resin on which the surface shape of the riblet structure 1 is transferred, attaching the sheet to a surface of an object such as an aircraft body of an aircraft, and removing the water-soluble resin from the surface. The water-soluble resin on which the surface shape of the riblet structure 1 is transferred is formed by transfer using a roller having, on one surface thereof, irregularities corresponding to the surface shape of the riblet structure 1.

The riblet 3 according to this embodiment is configured such that the width W between the peak bases 5 and 6 in the direction orthogonal to the flow direction x of the fluid becomes smaller as the angle β formed between the ridge line 4 and the flow direction x of the fluid becomes larger; and in the cross-sectional shape in the direction z orthogonal to the flow direction of the fluid, an angle α formed between a slope 5a (6a) of the peak and the surface 2 at the peak base 5 (6) is identical at any position. Further, in the riblet structure 1 according to this embodiment, all the riblets 3 have the same shape, and thus all the riblets 3 are configured such that the width W between the peak bases 5 and 6 in the direction orthogonal to the flow direction x of the fluid becomes smaller as the angle β formed between the ridge line 4 and the flow direction x of the fluid becomes larger; and in the cross-sectional shape in the direction z orthogonal to the flow direction of the fluid, the angle α formed between the slope 5a (6a) of the peak and the surface 2 at the peak base 5 (6) is identical. In other words, an adjacent riblet 3 is configured such that the width W between peak bases 5 and 6 in the direction orthogonal to the flow direction x of the fluid becomes smaller as an angle β formed between the ridge line 4 and the flow direction x of the fluid becomes larger; and in the cross-sectional shape in the direction z orthogonal to the flow direction of the fluid, an angle α formed between a slope 5a (6a) of a peak and the surface 2 at a peak base 5 (6) is identical at any opposed position.

Therefore, irregularities, by which the tip of the riblet 3 can be formed to have an acute angle, can be formed in the surface of the roller by only moving a tool bit, and the riblets 3 transferred using such a roller do not require the operation of cutting the tip thereof as in conventional riblets. Thus, the riblet structure 1 according to this embodiment can be easily manufactured, and additionally, the tip of the riblet 3 has an acute angle at any position, so that the surface friction resistance can be reduced and the resistance reducing performance can be enhanced.

Note that the irregularities formed in the surface of the roller can also be formed by endmills, not by a tool bit. In this case as well, irregularities, by which the tip of the riblet 3 can be formed to have an acute angle, can be formed in the surface of the roller by only moving endmills. In this case, the riblet 3 has a curved surface between the slope 5a (6a) of the peak and the surface 2 at the peak base 5 (6) in the cross-sectional shape in the direction z orthogonal to the flow direction of the fluid, but the curvature of those curved surfaces only needs to be identical at any position.

Example of Riblet Structure

Figure 5:
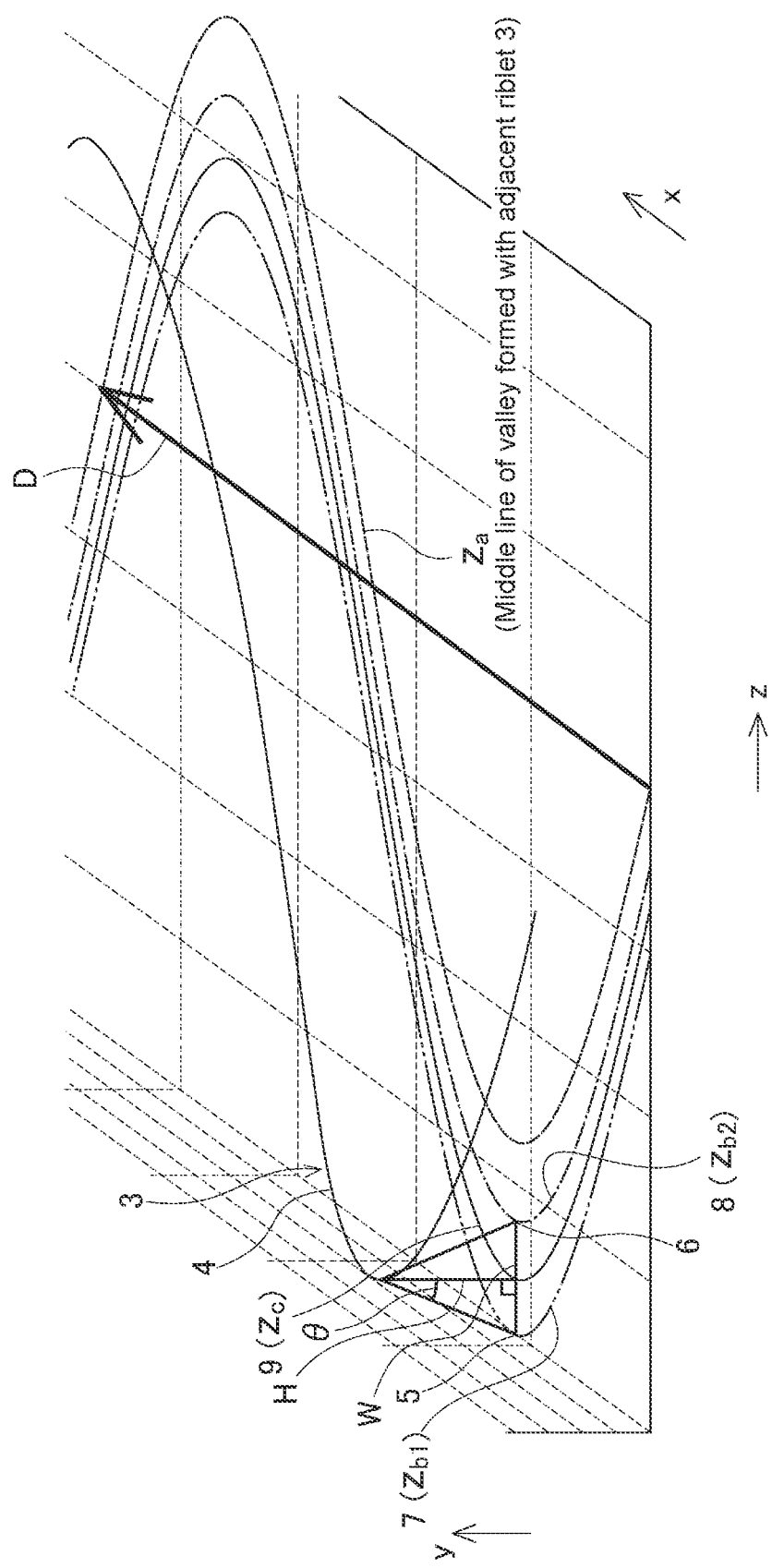
FIG. 5 is a diagram showing a ridge line, peak base lines, and the center line between peak bases of a riblet according to an example of the riblet structure by using x-y-z axes.
Figure 6:
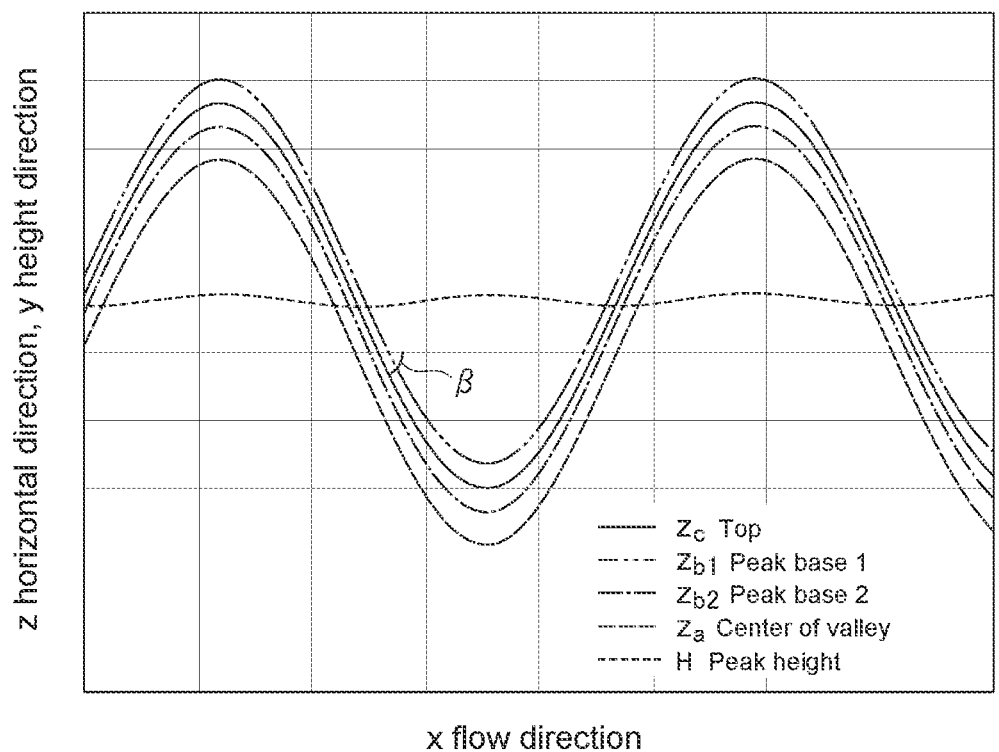
FIG. 6 is a graph showing the ridge line, the peak base lines, and the center line between the peak bases of the riblet shown in FIG. 5 by using x-z coordinates and showing a height (ridge line) of the riblet by using x-y coordinates.

FIG. 5 is a diagram showing the ridge line 4, the peak base lines 7 and 8, and the center line 9 between the peak bases 5 and 6 of the riblet 3 according to an example of the riblet structure 1 by using x-y-z axes. FIG. 6 is a graph showing the peak base lines 7 and 8 and the center line 9 between the peak bases 5 and 6 of the riblet 3 by using the x-z coordinates and showing the height (ridge line) of the riblet by using the x-y coordinates. Note that the x direction is the flow direction of the fluid, and y is the height direction of the riblet 3.

If the peak of the riblet is a triangle, assuming that the middle line of a valley formed with a riblet 3 adjacent to one riblet 3 is $z_a$, the center line 9 between the peak bases 5 and 6 is $z_c$, the height of the peak of the riblet 3 is H, one peak base line 7 is $z_{b1}$, and the other peak base line 8 is $Z_{b2}$, curved lines represented by the following functions are set.

$$z_a = A \cdot \sin(2\pi x/\lambda 1)$$

$$z_c = z_a + s/2 = A \cdot \sin(2\pi x/\lambda_1) + s/2$$

$$H = (h-a) - a \cdot \cos(2\pi x/\lambda_2)$$

where $\lambda_1$: a wave-shaped wavelength when the riblet 3 is viewed from above the surface 2 (upper surface),
$\lambda_2$: a wavelength of the height of the riblet 3 $\lambda_2 = 0.5\lambda_1$,
A: an amplitude on the x-z plane of the middle line of the valley,
s: intervals between riblets,
h: the maximum height of the peak, and
a: an amplitude of the height of the peak, $$z_{b1} = z_c - H \tan\theta$$

$$= (A \cdot \sin(2\pi x/\pi_1) + s/2) - ((h-a) - a \cdot \cos(2\pi x/\lambda 2))\tan\theta$$

$$z_{b2} = z_c + H \tan\theta$$

$$= (A \cdot \sin(2\pi x/\lambda_1) + s/2) + ((h-a) - a \cdot \cos(2\pi x/\lambda_2))\tan\theta$$

Figure 7:
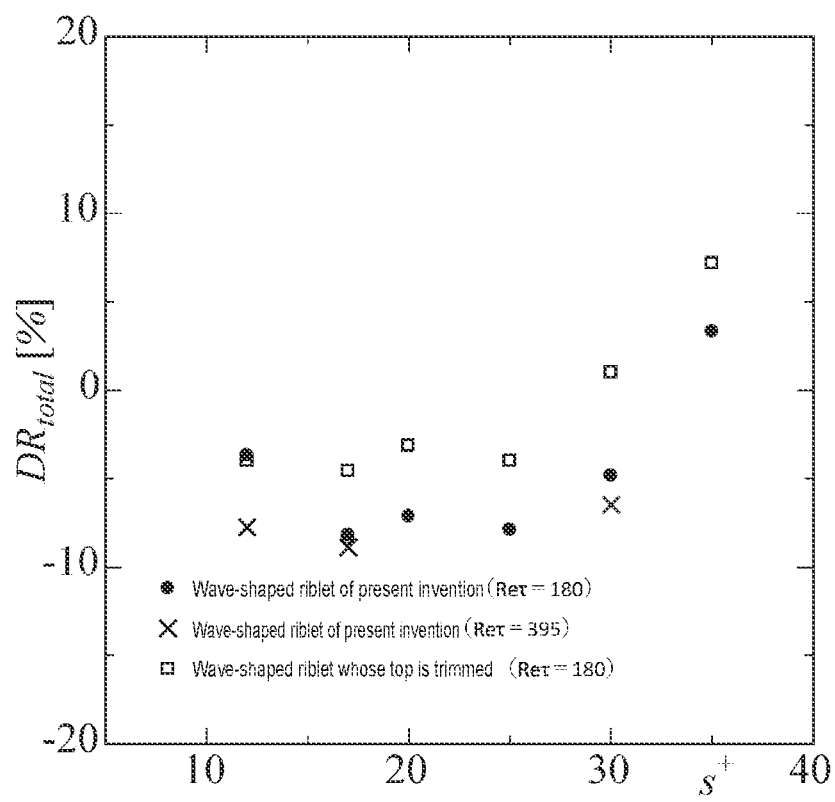
FIG. 7 is a graph showing comparison of resistance reducing performance of the riblet structure with resistance reducing performance of a conventional riblet structure.

In order to confirm the resistance reducing performance of the riblet structure 1 according to this example, analysis results obtained by the inventors of the present invention are shown in FIG. 7. FIG. 7 shows a resistance reducing rate of various riblets obtained by a wind tunnel test. Note that all riblets have an apex angle of 45°. The resistance reducing rate ($DR_{total}$) used herein is for a wall index $s^+$ of the peak intervals (corresponding to the intervals s) of the riblets.

$$s^+ = s(u_\tau/v)$$

where s: an interval (m) between the riblets,
$u_\tau$: a friction speed (m/s), and
v: a kinetic viscosity (m²/s), Resistance reducing rate ($DR_{total}$)={(total resistance on riblet surface)−(total resistance on smooth surface)}/(total resistance on smooth surface). The smooth surface refers to a flat surface with no riblets, and the total resistance on the smooth surface is the total surface friction resistance.

As shown in FIG. 7, when the wave-shaped riblet according to the present invention is compared with a wave-shaped riblet in which the top is trimmed and a peak height is adjusted, it is found that the wave-shaped riblet according to the present invention has better resistance reducing performance, though there is a difference depending on an airflow condition Reτ. It is found that the resistance can be reduced by approximately 8% at a maximum.

It is found from FIG. 7 that the resistance reducing rate is smallest in the vicinity of $s^+ = 17$. In addition, it is found that, even in values other than the vicinity of $s^+ = 17$, the wave-shaped riblet according to this example has an improved resistance reducing effect as compared with the conventional wave-shaped riblet. For example, if the riblets are mounted on an aircraft, since the flight cannot be necessarily performed in the vicinity of the optimal conditions of the riblets, robustness to the value of $s^+$ other than the optimal conditions is important. In other words, it can be said that the wave-shaped riblet according to this example improves the robustness of the resistance reducing effect as compared with the conventional wave-shaped riblets.

<Others>

The present invention is not limited to the embodiment described above, and various modifications or applications may be made thereto without departing from the range of the technical idea. The range of implementation is also encompassed in the technical range of the present invention.

In the embodiment described above, the cross-section of the riblet 3 has a triangular shape, and the cross-sectional shape in the direction orthogonal to the flow direction x of the fluid is similar at any position, but if the shape at the vicinity of the top is similar at any position in the cross-sectional shape in the direction orthogonal to the flow direction of the fluid, the cross-sectional shape is not limited to that shape. The vicinity of the top refers to, if it is defined purposely, a region lower than the top by the minimum height of the riblet.

In the embodiment described above, the apex angle of the top of the riblet 3 is approximately 45°. However, of course, the apex angle may be made smaller than that angle to enhance the resistance reducing effect. The apex angle of the top of the riblet 3 may be made larger than approximately 45° to enhance the strength.

The wave shape in the embodiment described above typically has a sinusoidal shape, but it means that, if curved surfaces other than the sinusoidal shape are continuous to some extent, those curved surfaces are also included.

In the present invention, all the riblets constituting the riblet structure may be the wave-shaped riblets according to the present invention, but part of the region may be the wave-shaped riblets.

The present invention can be applied to various technical fields. For example, the present invention can be applied to pipe arrangement of plants, pipelines, and the like, so that fluid transport efficiency and the like can be improved. If the present invention is applied to the field of fluid machinery, surface friction resistance can be reduced.

REFERENCE SIGNS LIST

1: riblet structure
2: surface
3: riblet
4: ridge line
5: peak base
6: peak base
7: peak base line
8: peak base line
H: height of riblet
θ: half apex angle of top of riblet
α: angle formed between slope of peak and surface at peak base
β: ridge line and flow direction of fluid
W: width between peak bases

The invention claimed is:

1. A riblet structure, comprising:
a plurality of wave-shaped riblets being arranged in parallel in a first direction on a surface thereof,
wherein an amplitude direction of waves of the wave-shaped riblets is the same as the first direction,
wherein each of the riblets has a smaller peak height from the surface as a first angle formed between a ridge line of the riblet and a second direction becomes larger, the second direction being an advance direction of waves of the wave-shaped riblets,
wherein a width between peak bases, of wave-shaped riblets of the plurality of wave-shaped riblets that are adjacent to each other, in the first direction becomes smaller as the first angle becomes larger, and
wherein a second angle formed between a slope of a peak of the riblet and the surface at the peak base or a curvature at the peak base is identical at any position in a cross-sectional shape in the first direction.

2. The riblet structure according to claim 1, wherein the second direction that is the advance direction of the waves of the wave-shaped riblets is a flow direction of a fluid flowing on the surface.

3. The riblet structure according to claim 1, wherein each of the riblets has an acute-angled top.

4. An object, comprising:
a riblet structure including a plurality of wave-shaped riblets being arranged in parallel in a first direction on a surface thereof,
wherein an amplitude direction of waves of the wave-shaped riblets is the same as the first direction,
wherein each of the riblets has a smaller peak height from the surface as a first angle formed between a ridge line of the riblet and a second direction becomes larger, the second direction being an advance direction of waves of the wave-shaped riblets,
wherein a width between peak bases, of wave-shaped riblets of the plurality of wave-shaped riblets that are adjacent to each other, in the first direction becomes smaller as the angle becomes larger, and
wherein a second angle formed between a slope of a peak of the riblet and the surface at the peak base or a curvature at the peak base is identical at any position in a cross-sectional shape in the first direction.

5. The object according to claim 4, wherein the ridge line of each riblet of the plurality of riblets has a sinusoidal shape.

6. The object according to claim 5, wherein the peak heights of the riblets differ from each other in a sinusoidal manner.

7. The object according to claim 4, wherein the peak heights of the riblets differ from each other in a sinusoidal manner.

8. The object according to claim 4, wherein the second direction that is the advance direction of the waves of the wave-shaped riblets is a flow direction of a fluid flowing on the surface.

9. The object according to claim 4, wherein each of the riblets has an acute-angled top.

10. A riblet structure, comprising:
a plurality of wave-shaped riblets on a surface thereof,
wherein each of the riblets has a smaller peak height as a first angle formed between a ridge line and a first direction becomes larger, the first direction being an advance direction of waves of the wave-shaped riblets,
wherein a width between peak bases in a direction orthogonal to the first direction becomes smaller as the first angle becomes larger,
wherein a second angle formed between a slope of a peak of the riblet and the surface at the peak base or a curvature at the peak base is identical at any position in a cross-sectional shape in the direction orthogonal to the first direction,
wherein the ridge line of each of the riblets has a sinusoidal shape, and
wherein a height of each of the riblets changes in a sinusoidal manner.

* * * * *